(12) United States Patent
Whymark

(10) Patent No.: US 7,624,409 B2
(45) Date of Patent: Nov. 24, 2009

(54) MULTI-MARKET BROADCAST TRACKING, MANAGEMENT AND REPORTING METHOD AND SYSTEM

(75) Inventor: Thomas J. Whymark, Bethlehem, PA (US)

(73) Assignee: The Nielsen Company (US), LLC, Schaumburg, IL (US)

( * ) Notice: Subject to any disclaimer, the term of this patent is extended or adjusted under 35 U.S.C. 154(b) by 956 days.

(21) Appl. No.: 10/274,018

(22) Filed: Oct. 18, 2002

(65) Prior Publication Data

US 2004/0025177 A1    Feb. 5, 2004

(51) Int. Cl.
H04N 7/025    (2006.01)
(52) U.S. Cl. .......................... 725/34; 725/22
(58) Field of Classification Search .................. 725/32, 725/34

See application file for complete search history.

(56) References Cited

U.S. PATENT DOCUMENTS

| | | |
|---|---|---|
| 2,881,244 A | 4/1959 | Pawley et al. |
| 3,845,391 A | 10/1974 | Crosby |
| 4,025,851 A | 5/1977 | Haselwood et al. |
| 4,079,419 A | 3/1978 | Siegle et al. |
| 4,230,990 A | 10/1980 | Lert, Jr. et al. |
| 4,313,197 A | 1/1982 | Maxemchuk |
| 4,425,661 A | 1/1984 | Moses et al. |
| 4,547,804 A | 10/1985 | Greenberg |
| 4,639,779 A | 1/1987 | Greenberg |
| 4,805,020 A | 2/1989 | Greenberg |
| 4,931,871 A | 6/1990 | Kramer |
| 4,945,412 A | 7/1990 | Kramer |

(Continued)

FOREIGN PATENT DOCUMENTS

JP    6369398    3/1988

(Continued)

OTHER PUBLICATIONS

Notice of Allowance issued for U.S. Appl. No. 10/465,722, dated Nov. 2, 2005, 3 pages.

(Continued)

Primary Examiner—John W Miller
Assistant Examiner—Oschta Montoya
(74) Attorney, Agent, or Firm—Hanley, Flight & Zimmerman, LLC

(57) ABSTRACT

A method for confirming and reporting on fulfilled and unfulfilled advertising orders includes assigning unique identifiers to a plurality of commercial advertisements, recording information regarding the plurality of commercial advertisements and the respective unique identifiers in a computer database, receiving electronic detections of a plurality of actual market-broadcast instances of a commercial advertisement from a plurality of broadcast markets, recording information regarding the detections in a computer database, associating related ones of the plurality of actual market-broadcast instances of the commercial advertisement in a computer database, the related ones of the actual market-broadcast instances being from a plurality of broadcast markets and being related to a common featured program broadcast in the plurality of broadcast markets, recording information regarding a plurality of multi-market broadcast orders of commercial advertisements in a computer database, and associating the associated related actual market-broadcast instances of the commercial advertisement with a related multi-market broadcast order for the commercial advertisement in a computer database, the multi-market broadcast order comprising the plurality of broadcast markets.

22 Claims, 5 Drawing Sheets

U.S. PATENT DOCUMENTS

| | | | |
|---|---|---|---|
| 4,967,273 | A | 10/1990 | Greenberg |
| 5,200,822 | A | 4/1993 | Bronfin et al. |
| 5,379,345 | A | 1/1995 | Greenberg |
| 5,450,122 | A | 9/1995 | Keene |
| 5,450,490 | A | 9/1995 | Jensen et al. |
| 5,579,124 | A | 11/1996 | Aijala et al. |
| 5,646,675 | A | 7/1997 | Copriviza et al. |
| 5,652,615 | A | 7/1997 | Bryant et al. |
| 5,719,937 | A | 2/1998 | Warren et al. |
| 5,737,025 | A | 4/1998 | Dougherty et al. |
| 5,774,170 | A | 6/1998 | Hite et al. |
| 5,774,452 | A | 6/1998 | Wolosewicz |
| 5,787,334 | A | 7/1998 | Fardeau et al. |
| 5,822,360 | A | 10/1998 | Lee et al. |
| 5,826,165 | A | 10/1998 | Echeita et al. |
| 6,075,551 | A | 6/2000 | Berezowski et al. |
| 6,279,157 | B1 | 8/2001 | Takasu |
| 6,286,005 | B1 | 9/2001 | Cannon |
| 6,353,929 | B1 * | 3/2002 | Houston ............... 725/20 |
| 6,388,712 | B1 | 5/2002 | Shinohara et al. |
| 6,708,335 | B1 | 3/2004 | Ozer et al. |
| 6,799,326 | B2 | 9/2004 | Boylan, III et al. |
| 7,039,931 | B2 | 5/2006 | Whymark |
| 2002/0059578 | A1 | 5/2002 | Nishiura |
| 2002/0075402 | A1 | 6/2002 | Robson et al. |
| 2002/0178445 | A1 * | 11/2002 | Eldering et al. ............... 725/32 |
| 2003/0070167 | A1 | 4/2003 | Holtz et al. |
| 2003/0101454 | A1 * | 5/2003 | Ozer et al. ............... 725/42 |
| 2003/0115587 | A1 | 6/2003 | Kendall et al. |
| 2003/0115591 | A1 | 6/2003 | Weissmueller, Jr. et al. |
| 2004/0003398 | A1 | 1/2004 | Donian et al. |
| 2004/0024633 | A1 | 2/2004 | Whymark |
| 2006/0195863 | A1 | 8/2006 | Whymark |

FOREIGN PATENT DOCUMENTS

| | | |
|---|---|---|
| JP | 1236760 | 9/1989 |
| WO | 2004036388 | 4/2004 |

OTHER PUBLICATIONS

Office Action issued for U.S. Appl. No. 11/400,944, dated Dec. 18, 2008, 9 pages.

Office Action issued for U.S. Appl. No. 10/278,332, dated Jun. 30, 2005, 6 pages.

Office Action issued for U.S. Appl. No. 10/465,722, dated Mar. 11, 2005, 14 pages.

* cited by examiner

FIG. 3

| Flight PON | : All |
| Flight Client | : YNOT |
| Market | : NATL |
| Start Date | : 2001/10/01 - 2002/10/14 |

| Network | Program | Week Of | MTWTFSS | TimeSlot | ISCI | Pur ch | Air Dates | Duration |
|---|---|---|---|---|---|---|---|---|
| ABC | ABC NEWS NL-MON. | 2001/11/05 | YNNNNNN | 12:35 AM-01:05 AM | ZZYN9220* | 1 | 2001-11-05 - 2001-11-05 | 30 |
| | | 2001/11/12 | YNNNNNN | 12:35 AM-01 05 AM | ZZYN9220* | 1 | 2001-11-12 - 2001-11-12 | 30 |
| | THIS WEEK | 2001/11/05 | NNNNNNY | 09:00 AM-10:00 AM | ZZYN9220* | 1 | 2001-11-11 - 2001-11-11 | 30 |
| | COLLEGE FTBALL | 2001/11/05 | NNNNNYN | 12:00 PM-03:00 PM | ZZYN9220* | 1 | 2001-11-10 - 2001-11-10 | 30 |
| | | 2001/11/19 | NNNNNYN | 03:30 PM-07:00 PM | ZZYN9220* | 1 | 2001-11-17 - 2001-11-17 | 30 |
| | AMERICA 01 | 2001/11/05 | NNNNYNN | 08:00 PM-09:00 PM | ZZYN9220* | 1 | 2001-11-09 - 2001-11-09 | 30 |
| | MILLIONAIRE-MON | 2001/11/05 | YNNNNNN | 08:00 PM-09:00 PM | ZZYN9220* | 1 | 2001-11-05 - 2001-11-05 | 30 |
| | SAT. MOVIE | 2001/11/05 | NNNNNYN | 08:00 PM-11:00 PM | ZZYN9220* | 1 | 2001-11-10 - 2001-11-10 | 30 |
| | WHOSE LINE-8PM | 2001/11/05 | NNNYNNN | 08:00 PM-08:30 PM | ZZYN9220* | 1 | 2001-11-08 - 2001-11-08 | 30 |
| | NFL MNF-SHOWCASE | 2001/11/12 | YNNNNNN | 09:00 PM-09:08 PM | ZZYN9220* | 1 | 2001-11-12 - 2001-11-12 | 30 |
| | NYPD BLUE (TUE) | 2001/11/05 | NYNNNNN | 09:00 PM-11:00 PM | ZZYN9220* | 1 | 2001-11-06 - 2001-11-06 | 30 |
| | | 2001/11/12 | NYNNNNN | 09:00 PM-10:00 PM | ZZYN9220* | 1 | 2001-11-13 - 2001-11-13 | 30 |
| | NFL MON NIGHT F | 2001/11/12 | YNNNNNN | 09:08 PM-11:00 PM | ZZYN9220* | 1 | 2001-11-12 - 2001-11-12 | 30 |
| | 20/20-WED | 2001/11/12 | NNYNNNN | 10:00 PM-11:00 PM | ZZYN9220* | 1 | 2001-11-14 - 2001-11-14 | 30 |
| | ONCE & AGAIN | 2001/11/05 | NNNNYNN | 10:00 PM-11:00 PM | ZZYN9220* | 1 | 2001-11-09 - 2001-11-09 | 30 |
| | PHILLY | 2001/11/12 | NYNNNNN | 10:00 PM-11:00 PM | ZZYN9220* | 1 | 2001-11-13 - 2001-11-13 | 30 |
| | ABC NEWS NIGHTLI | 2001/11/05 | YYYYYNN | 11:30 PM-12:00 AM | ZZYN9220* | 1 | 2001-11-07 - 2001-11-09 | 30 |
| | | 2001/11/12 | NYNNNNN | 11:30 PM-12:00 AM | ZZYN9220* | 1 | 2001-11-13 - 2001-11-13 | 30 |

FIG. 5

| | | National Matching with Market Details | | | |
|---|---|---|---|---|---|
| PON | : | YNOT_NATIONAL | | | |
| Start Air Dates | : | 2001/10/01-2002/10/14 | | | |
| Market | : | National Drill Down | | | |
| Network | : | ABC | | | |
| Air Dates | : | 2001-11-11-2001-11-11 | | | |
| MTWTFSS | : | NNNNNNY | | | |
| Time | : | 09:00 AM-10:00 AM | | | |
| Item # | : | 1 of 1 | | | |
| ISCI | : | ZZYN9222 | | | |
| Scheduled Program | : | This Week With Sam Donaldson and Cokie R | | | |

| Market | Call Letter | Date | Aired Day | Time | Discr |
|---|---|---|---|---|---|
| NATL | ABC | 2001/11/11 | SUNDAY | 09:40:13 AM | |
| ST | KOMO | 2001/11/11 | SUNDAY | 09:40:16 AM | |
| SF | KGO | 2001/11/11 | SUNDAY | 08:40:16 AM | |
| SC | KTVX | 2001/11/11 | SUNDAY | 10:40:17 AM | |
| SD | KGTV | 2001/11/11 | SUNDAY | 10:40:16 AM | |
| PX | KNXV | 2001/11/11 | SUNDAY | 09:10:17 AM | |
| PH | WPVI | 2001/11/11 | SUNDAY | 11:40:23 AM | |
| NY | WABC | 2001/11/11 | SUNDAY | 09:40:13 AM | |
| MI | WPLG | 2001/11/11 | SUNDAY | 11:10:17 AM | |
| LA | KABC | 2001/11/11 | SUNDAY | 08:40:15 AM | |
| HO | KTRK | 2001/11/11 | SUNDAY | 10:44:18 AM | |
| DV | KMGH | 2001/11/11 | SUNDAY | 09:40:13 AM | |
| DT | WXYZ | 2001/11/11 | SUNDAY | 11:10:17 AM | |
| DL | WFAA | 2001/11/11 | SUNDAY | 10:10:18 AM | |
| DC | WJLA | 2001/11/11 | SUNDAY | 12:10:06 PM | |
| CH | WLS | 2001/11/11 | SUNDAY | 10:10:18 AM | |
| BS | WCVB | 2001/11/11 | SUNDAY | 11:40:16 AM | |

MULTI-MARKET BROADCAST TRACKING, MANAGEMENT AND REPORTING METHOD AND SYSTEM

FIELD OF THE INVENTION

The invention pertains to the field of commercial broadcast advertising, and in particular, to confirming and reporting on fulfilled and unfulfilled broadcast advertising orders.

BACKGROUND AND SUMMARY OF THE INVENTION

Broadcasts on commercial broadcast mediums, such as commercial radio or television airwave frequencies, cable television systems, or satellite television or satellite radio systems typically include commercial advertising interspersed within and among featured programs, such as shows, sporting events and news programs. Broadcasts are transmitted on predefined channels of broadcast mediums, however a particular broadcast may be transmitted on more than one broadcast medium at the same time. In particular, broadcast television stations, which historically transmitted solely via commercial television airwaves, are now commonly re-transmit via (i.e., are carried by) cable television systems and satellite broadcast systems as well. Further, the broadcast medium used to deliver the broadcast to a consumer may be operated by a carrier system that is independent of the originator of the broadcast—as is often the case with a broadcast from a broadcast television station delivered to consumers via a cable or a satellite television system.

The broadcasts of multi-market broadcasters, such as national television broadcast networks, national cable network channels, national radio broadcast networks, satellite channels, and the like, include multiple broadcast markets. Examples of national television broadcast networks include ABC, NBC and CBS; examples of nation cable network channels include ESPN, CNN, The Comedy Channel, HBO, etc. To compensate for time differences between distant markets, multi-market broadcasters may transmit (or may direct others to transmit on their behalf) multiple feeds of their broadcast. These feeds may be simply time-delayed or may also include changes in the programming. Some events, like speeches and certain championship sporting events may be covered live across all time zones.

The responsibility for the selection and arrangement of featured programs (i.e., the programming) varies by the type of broadcaster. In the case of television broadcasts, local television stations typically have an affiliation to (and may be owned by) a national television broadcast network (e.g., ABC, NBC, or CBS). The national television broadcast network typically determines and provides all of the programming during predefined "prime time" hours, which are generally the weekday evening hours during which the viewing audience reaches a maximum. The programming during these time periods may be delivered to each affiliated local television station from the national television broadcast network in one or more so called "network feeds." Local radios stations may have a similar affiliation with a national radio broadcast network that determines certain programming of the local radio station broadcast.

The programming of local broadcasters and of multi-market broadcasters (e.g., a national cable network channel) may also be provided in part by a syndicator, which owns rights to distribute certain programs that are in "syndication." In the case of a local television broadcaster affiliated with a multi-market broadcast network, programming provided by a syndicator is broadcast in non-prime time hours. Typically syndicators provide programming in all or a large number of the markets in a nation or region.

For the purposes of this description, the organization that determines the programming of a broadcast is described as the broadcast originator or distributor of that programming. Thus, a national broadcast television network is the broadcast originator or distributor of programming which is (usually) aired during prime time hours and other shows which have national interest. Such programming will appear only on the affiliates of that network. Similarly, a syndicator is the broadcast originator or distributor of its syndicated programming broadcast by a local or multi-market broadcaster; however syndicated programs are not restricted to any one network. And, the local broadcaster is the broadcast originator or distributor for programming determined by the local broadcaster itself. For example, a local television station is typically the broadcast originator (or distributor) of non-prime time programming not in syndication, such as a local news program.

Advertisers of commercial goods and services may purchase space for advertising from any of the three types of broadcast originators (or distributors) during the time for which the distributor is the broadcast originator for the programming of a broadcast. An advertising "buy" from a particular distributor may include detailed specifications as to the space(s) desired for the advertisement, such as the featured programs, dates, days of the week, time range, duration, markets and number of instances. The purchase may be for commercial air time on a market or outlet basis (spot or local cable), or it could be at the national network level where its part of the national feed which is sent out across the country. Advertisers also include detailed specifications as to the particular content or advertisements to be placed in the desired spaces (i.e., "traffic" information). The combination of the buy and traffic specifications is referred to herein as "flight information."

To enhance the effect of broadcast advertising campaigns, an advertiser will often purchase advertising space from a number of different distributors with varied buy and traffic information. Further, typically such purchases may be arranged and managed by an advertising agency or media buyer that may have a large number of such clients. Therefore, it can be appreciated that the tasks of managing and confirming fulfillment of advertising orders can be complex and burdensome.

In an effort to confirm that orders for advertising have been properly fulfilled, entities responsible for broadcasting advertisements (i.e., the broadcast originators or distributors) typically produce sworn affidavits in which the affiant declares that the orders have been satisfied. However, these affidavits are not prepared by disinterested persons and, in addition, are subject to human error. Other efforts to confirm that orders for advertising have been properly fulfilled include the employment of independent human viewers to manually catalog broadcasts of advertisements. This method is also subject to human error, and this method is not feasible for the currently large and continually growing number of broadcasts. Further methods include electronic monitoring of broadcasts. However, none of the confirmation methods known heretofore provide significant advantages or improvements in matching multi-market broadcasts of advertisements to multi-market advertising orders or in providing dynamic reports regarding fulfilled and unfulfilled orders.

Therefore, what is desired is broadcast advertisement tracking, managing and reporting method and system that provide accurate, independent confirmations of the fulfillment of broadcast advertising orders, that provide significant advantages in matching multi-market broadcasts of advertisements to multi-market advertising orders, that provide significant advantages in reporting of fulfilled and unfulfilled orders and that provide such matching, confirmation and reporting for a large number of broadcasts over a large number of broadcast markets.

The present invention overcomes the limitations of prior methods of confirming fulfillment of order for broadcast items, such as commercial advertising orders, and provides substantial improvements in the efficiency and accuracy of such confirmation and in the ability to produce dynamic reports or fulfilled and unfilled orders. A system established according to the present invention includes a plurality of electronic detection devices located in the various broadcast markets that are configured to receive and analyze broadcasts on a number of channels of a number of broadcast mediums.

The detection devices detect instances of actual broadcasts of encoded broadcast items, such as encoded advertisements, and record information regarding each detected actual broadcast in a log. Any suitable method for encoding or assigning unique codes to broadcast items may be employed with the present invention; however, preferably the method is able to detect the date, time, channel and duration of the broadcast item, in addition to the code.

In the method of the present invention, detection information is consolidated from the plurality of detection devices and processed. In the processing of detections, related multi-market detections of instances of actual broadcasts of encoded broadcast items are associated to one another, by one or more computing devices, using various reference data and published program schedules. The associated multi-market detections are then associated with a related multi-market order received from an advertiser or agency to indicate whether, and to what extent, the multi-market order has been fulfilled. Further, single-market detections of instances of actual broadcasts of encoded broadcast items are associated with related market focused advertising orders (i.e., "spot" buys) to indicate whether (and to what extent) the single-market advertising order has been fulfilled. In addition to recognizing accurately fulfilled advertising orders, the method also recognizes a number of predetermined commonly occurring errors in fulfilling orders, such as the broadcast of an incorrect advertisement in the correct space. The method also provides detailed reports of fulfilled, erroneous and unfulfilled advertising orders, with the ability to quickly and conveniently access or, "drill down" to, detailed information regarding the individual detections associated with multi- and single-market advertising orders.

BRIEF DESCRIPTION OF THE DRAWINGS

For a complete understanding of the above and other features of the invention, reference shall be made to the following detailed description of the preferred embodiments of the invention and to the accompanying drawings, wherein:

FIGS. 2-5 are screen shots of reports generated by the present method and system.

DETAILED DESCRIPTION OF THE PREFERRED EMBODIMENTS

Step 1—Reference Information

Figure 1:
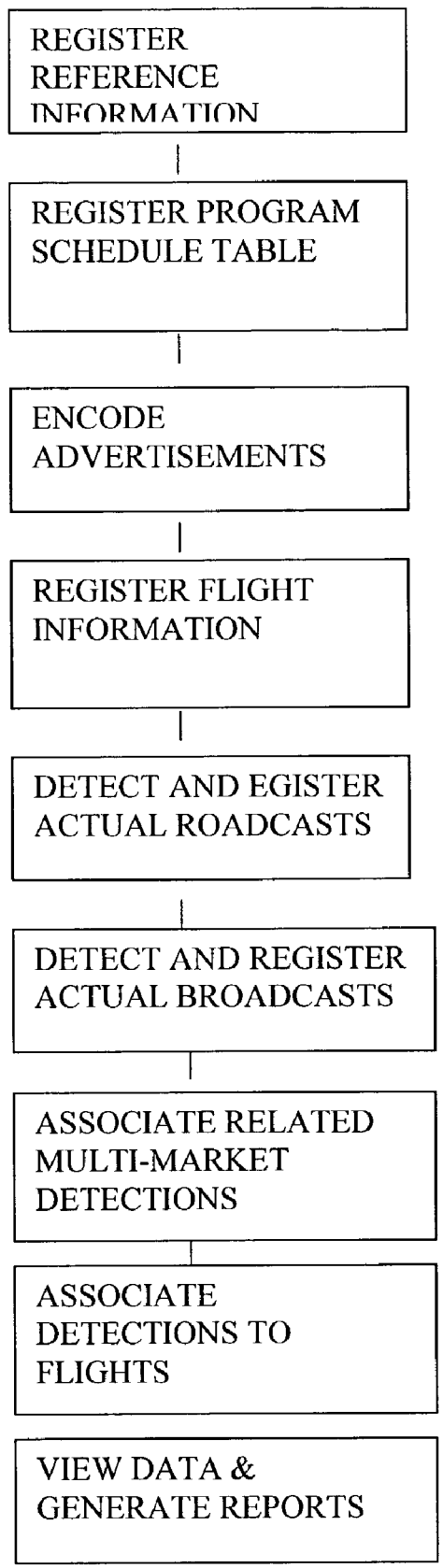
FIG. 1 is a schematic diagram of the system of the present invention.
Figure 2:

Referring to FIG. 1, a first step in the method of the present invention comprises the gathering and registration of certain reference information to be used in associating related detections of actual broadcasts of encoded broadcast items (e.g., encoded advertisements) with one another, and in associating such detections to related advertising orders. Such reference information includes advertising agency (media buyer) information, broadcaster information, syndication information, monitoring device information, and authorized user information.

Agency Information

Agency information includes information on the advertisements for which each agency is are responsible, the definition of the "broadcast day" for the agency, and the time allowances for each agency, their clients, and the type of advertising for those clients (national or market focused). The codes associated with an agency client combination handling both national and market focused campaigns are usually different allowing variations in other configuration settings described later on in this document.

By industry custom, individual advertisements are assigned a unique code that may be used to distinguish the advertisement from others and may be used to determine the advertising agency and client responsible for the advertisement. In television, the code is the ISCI code, which is distributed by an industry organization, AAAA. In the present method, information regarding the agency, the advertisements associated with the agency and the date range that the agency is associated with the advertisement are held in an agency commercial table having the following fields:

| AGENCY COMMERCIAL TABLE |
| --- |
| ISCI CODE |
| AGENCY NAME (or Code) |
| CLIENT NAME (or code) |
| START DATE (hired) |
| END DATE (fired) |

For each agency, the "broadcast day" may not match with the calendar day. Often the broadcast day begins and ends at 1 or 2 a.m sometimes as late as 6am. The definition may vary depending on the client and the type of advertisement which is being performed for the client (i.e., either national or market focused advertisement order). This information may be stored in a broadcast day computer database table having the following fields:

| BROADCAST DAY TABLE |
| --- |
| AGENCY NAME (or code) |
| CLIENT NAME (or code) |
| CUT-OFF TIME |

The agency information also includes information regarding the time allowances customarily given to distributors for placing advertisements, which may vary depending on the agency and client, and whether the advertisement is for a local or multi-market (e.g., national) advertising campaign. The time allowance is commonly +/−2 minutes for a single-market advertising order and 0 minutes for a multi-market (or "national") order. This information may be stored in a time allowance database table having the fields identified below.

| TIME ALLOWANCE TABLE |
| --- |
| AGENCY NAME (or code)<br>CLIENT NAME (or code)<br>FROM TIME ALLOWANCE<br>END TIME ALLOWANCE |

When commercials are registered in the system a NATIONAL BROADCAST field is set to indicate wheether the commercial is National or local in nature. (i.e., national broadcast vs non-national broadcast) where a value of "Y" indicates a national order.

Broadcaster Information

Information for Broadcast Networks, Local Broadcaster stations, National Cable Networks, and syndication settings are stored in a table containing station/broadcaster information.

| STATION TABLE |
| --- |
| CALL LETTER<br>MARKET (eg NY, LA, etc for market or NATL for national)<br>NATIONAL CALL LETTER (associated network if broadcaster)<br>STATIONTYPE |

For example
- Broadcast station WABC in NY would be defined as
  - WABC, NY, ABC, TV
- National Cable channel SCIFI would be defined as
  - SCIFI, NATL, SCIFI ,CTV
- National Syndicator Columbia Tristar would be defined as
  - CTS, NATL, CTS, STV
- National Network ABC would be defined as
  - ABC, NATL, ABC, TV Preferably, there are ancillary referential table(s) allowing the easy translations of station codes into standard callletter/network codes, and to assist the application to view commonly used subsets (ie just the network, or just the syndications, etc)

The system also contains additional information regarding National Broadcast networks pime time coverage. These prime time periods for each multi-market broadcaster, which may vary depending on the market, the day of the week, and whether the locality of the market adheres to a seasonal time shift, such as daylight savings time. This information can be stored in a prime time table having the following fields:

| PRIME TIME TABLE |
| --- |
| BROADCASTER CODE<br>MARKET<br>DAY OF WEEK<br>FROM TIME<br>TO TIME<br>SEASONAL TIME SHIFT |

Syndication Information

The information regarding syndications includes syndicator names, which may be partial or complete names and an associated code for the syndicator, which may be an abbreviated code. This information may be stored in a syndicator table having the following fields:

| SYNDICATOR TABLE |
| --- |
| SYNDICATOR NAME<br>SYNDICATOR CODE |

Syndication information also includes programs known to be in syndication and the associated syndicator. This information may be stored in a syndication programs table having the following fields:

| SYNDICATIONS PROGRAMS TABLE |
| --- |
| SYNDICATION PROGRAM NAME<br>SYNDICATOR CODE |

Syndication information further includes a list of programs in syndication that appear on different days of the week in different markets. This information may be stored in a weekly syndication table having the following fields:

| WEEKLY SYNDICATION TABLE |
| --- |
| SYNDICATION PROGRAM NAME |

Split Channels

Cable distributers being re-broadcasters of signals could elect to give their customers cable coverage which changes from time of day. They may choose in the day time to air for some portion of time childrens programming, and then later in the day on that same channel change the feed and pick up a different channel to appeal to an older audience. There is another example of this where a cable network sublets part of their broadcasting day to another channel. An example of this is the USA Cable network sublets part of their early morning time to Bloomberg.

Monitoring Device Information

The information regarding the electronic monitoring devices of the system includes a unique identifier for each device and the broadcast market in which the device is physically located. This information may be stored in a monitoring device table, having the following fields:

| MONITORING DEVICE TABLE |
| --- |
| DEVICE I.D.<br>LOCATION MARKET |

Default National Time Adjustment for the Cable Networks

Another reference table that the system contains information on is a table that defines the default time adjustment value for each market that is to be applied to national detections on cable networks as the base adjustment. This information may be stored in a National cable adjustment table having the following fields:

| NATIONAL CABLE ADJUSTMENT TABLE |
| --- |
| NATIONAL CALLLETTER |
| MARKET |
| ADJUSTMENT |
| SEASONAL TIME SHIFT |
| FEED (east or west if applicable) |

Step 2—Program Schedule Table

Published Schedule Information

Another step in the method comprises gathering and registering published schedule information from various markets to build a multi-market schedule table. Certain schedules, such as television broadcast and cable schedules and are published in advance and are publicly available. Further, such schedules are often available in electronic format, or in a format that may be converted to an electronic format. Typically, separate schedules are published for each television market and include a date, a name (or description) of each featured program (e.g., show, sporting event or news event, etc.), a channel number, call letters for the broadcaster, and a start and end time. This information is gathered from the published schedules preferably by a computer algorithm adapted to locate and extract the desired information. The scheduled program data is preferably gathered on a regular basis, for example daily or weekly. A history of schedule information is preferably maintained in the program schedule table until such time as it is no longer needed.

Once gathered, the information is placed into the following fields of the program schedule table:

| PROGRAM SCHEDULE TABLE |
| --- |
| DATE |
| PROGRAM NAME |
| MARKET |
| BROADCASTER CALL LETTER |
| START TIME |
| END TIME |

Distributor Determination

Then, for each program listing in the program schedule table, a look-up is performed in the broadcaster table, based on the BROADCASTER CALL LETTER field of the program schedule table to determine the network affiliation of the broadcaster of each program listing, if any. The code for the network affiliation of the broadcaster, if any, is then placed in a supplemental NATIONAL CALL LETTER field and in a supplemental DISTRIBUTOR field of the appropriate record in the program schedule table. This indicates, at least presumptively, that the affiliated national broadcast network is responsible for the program. If there is no network affiliation for the broadcaster, then the value in the BROADCASTER CALL LETTER is copied to both the NATIONAL CALL LETTER field and DISTRIBUTOR field to indicate, at least presumptively, that the local broadcaster is responsible for the program.

Then, each program listing in the broadcast schedule table is compared to the prime time table information to determine if the program listing occurs outside "prime time" for that market/network/day-of-week combination. If the program listing occurs outside the FROM TIME and TO TIME of the MARKET+BROADCASTER CODE+DAY OF WEEK combination then, the PROGRAM NAME in the program schedule table is compared to the SYNDICATION PROGRAM NAME field in the syndication program table to determine if the program is a known program in syndication. If a match is found, then the associated SYNDICATOR CODE of the syndication program table is copied to the DISTRIBUTOR code of the program schedule table to indicate that the syndicator is responsible for the program.

Intra-Day Time Adjustments

For each schedule date, the START TIME for each program listing in the program schedule table is then compared to the START TIME of a first occurrence of a like DATE+PROGRAM NAME+DISTRIBUTOR combination in the program schedule table in a predetermined base market (e.g., the NY market). A supplemental TIME ADJUSTMENT field in the record for the first occurrence is set to zero (0) and the supplemental TIME ADJUSTMENT field in the compared record is set to the time difference (in minutes) between the START TIME of the first occurrence of the combination and the START TIME of the compared record. Preferably, the TIME ADJUSTMENT field has a negative value if the value in the START TIME field of the first occurrence of the combination is greater than that of the compared record.

Non-Standard Overrides

If desired, the TIME ADJUSTMENT field for certain program listings may be corrected using program instruction specifically tailored to set the correct time adjustment value for specific DATE+DAY OF WEEK+MARKET+START TIME combinations.

Weekly Syndication

Some programs in syndication occur on different days of the week in different markets. Therefore, after the intra-day time adjustment process is completed, the PROGRAM NAME field of the program listings in the program schedule table within a 7-day (inter-day) window, in the base market (e.g., the NY market), is compared to the SYNDICATION PROGRAM NAME field of the syndications programs table. If a match is found, then the program listings for all markets within the same inter-day window are compared to the first occurrence of the PROGRAM NAME+DISTRIBUTOR combination in the base market. If a match is found, the TIME ADJUSTMENT field of the compared record is adjusted according to the difference in time (in minutes) between the DATE+START TIME of the first occurrence of the program and the DATE+START TIME of the compared record. For example if a syndicated weekly program is scheduled to first occur in the NY market on Friday at 10:30 a.m. to occur in the LA market on Thursday at 9:30a.m., then the TIME ADJUSTMENT field for the program listing in the LA market would be—1500 minutes (25 hours×60 minutes/hour).

A separate schedule process is used to analyze cable channels. In general cable channels are much easier. However they do contain some slightly different wrinkles from the broadcast networks. In many cases there is only one feed of the Cable network, Thus there is no variation and nothing to compare adjust other than time zone implications. However some Cable networks have multiple feeds. Usually these will have an East Coast and an identical West coast feed which is simply time delayed 3 hours to make sure the same program which is on at 9pm on the east coast is on at 9pm for the west coast. While there is two schedules for that cable network to compare there are no differences and no calculated adjustments to be made. However from time to time some of the multi feed cable networks which are normally time delayed will carry a live event. This causes a diffence in part of the daily schedules the schedules. Which require adjustments to be made. This separate cable process is designed to recognize these three conditions and process the schedules accordingly.

Step 3—Encode Advertisements

Advertisements or other broadcast items to be tracked by the method are assigned a unique detection code, which is preferably the same as the associated ISCI code. Preferably, the detection code is embedded within the audio and/or video signal of the advertisement in a manner that permits the electronic extraction of the detection code during subsequent playback of the advertisement using specially adapted detection equipment. However, any other suitable method will suffice. For example a method of assigning and detecting a unique detection code that does not require the alteration of the original advertisement is within the scope of the method of the present invention. Such a unique code could be based on the inherent audio and/or video content of the advertisement, and thus is considered herein to be (inherently) "embedded", notwithstanding the fact that the original advertisement is not altered.

Information regarding the encoded advertisements may be held in an encoded advertisements table having the following fields:

| ENCODED ADVERTISEMENTS TABLE |
| --- |
| ISCI CODE |
| CLIENT NAME |
| AGENCY NAME |
| DURATION |
| MULTI-MARKET BROADCAST |
| DETECTION CODE |
| COMMERCIAL TITLE |

Step 4—Flight Information

Flight information may be provided by (or on behalf of) an agency in two parts—one part containing the "buy" information and a second part containing the traffic information, or may be provided as one unit. Buy information may be delivered or available in electronic form, such as an ASCII text computer file having separate line items for the buy information. The format of such files may vary somewhat depending on the agency or source, however the format is usually similar amongst different sources and is typically consistent within any given source. Traffic information may be delivered electronically, verbally or in paper form.

Buy information typically includes the following information:

| |
| --- |
| CLIENT |
| PRODUCT DESCRIPTION |
| ESTIMATE NUMBER |
| CALL LETTER (if spot) |
| NATIONAL CALLLETTER (if national) |
| START DATE |
| END DATE |
| DAY ROTATION (Ie M-F, SAT) |
| LENGTH OF SPOT |
| START TIME |
| END TIME |
| PROGRAM NAME |
| UNITS |

The buy information is preferably first loaded into one of a plurality of holding tables that is specific to the source of the buy information. This step is preferably accomplished using a parsing program, specific to the source of the buy information, that extracts the data from the buy information and loads the data into appropriate fields of the holding table.

If agency revises their buy, the system compares the buy in the system with the new variation and applies corrections to the tables as needed. This may simply overwrite the same records related to the same flight "estimate" within date range of revised buy information. Depending on the contents of the change this may also require the traffic instructions for the isci code definitions to be reviewed and possibly reapplied to the new flight records.

Then a conversion program, converts the buy information into the format described below and loads the information into a flight information table. In the conversion, a separate record is created for every unit specified in each line item of the buy information. For example, if a line item of the buy information specifies 3 UNITS, then the line item of the buy information will be converted to three records in the flight information table, each record having an ITEM NUMBER of "1 of 3", "2 of 3" or "3 of 3", respectively. The total number of spots in the line item of the buy information is recorded in a TOTAL SPOTS field in each of the records related to the line item of the buy information. Further, the START DATE, END DATE and DAY ROTATION information indicated in the line item of the buy information is converted (if necessary) to a WEEK OF field and daily fields: MONDAY, TUESDAY, WEDNESDAY, THURSDAY, FRIDAY, SATURDAY and SUNDAY. For example, if the DAY ROTATION value in the buy information was M-W, the values for the daily fields would be Y, Y, Y, N, N, N and N, respectively.

Further, during conversion, a look-up is performed in the time allowance table, base on the AGENCY+CLIENT+MULTI-MARKET BROADCAST fields in each flight record to obtain the associated TIME ALLOWANCE from the time allowance table. A FROM ALLOWANCE field of the flight record is set to equal the FROM TIME field less the TIME ALLOWANCE, and a TO ALLOWNCE field of the flight record is set to equal the TO TIME field plus the TIME ALLOWANCE is increased by the amount of the TIME ALLOWANCE.

If the traffic information is included with the buy information, the associated ISCI codes are placed in an ISCI GROUP field for each record of the flight information table. If the traffic information is delivered separately from the buy information, then the associated ISCI codes for the line item of the buy information are added manually either prior, during or after conversion of the buy information to the flight information table.

Further, if the buy information relates to a national advertisement, the callletter value in the flight table for each line in the buy contains the National Network, Cable or Syndication call letter. (Ie ABC for the ABC network), and the market value is set to NATL. If the buy is for a specific market or local distributer level than the callletter wll contain the local broadcast callletters or cable channels And the market value is set to the value of that individual market (ie NY, LA). It is often in this area that translation of a callletter into our standard codes, is utilized here. One agency may use DSC for "The Discovery Channel" another may use DISC and another may use TDC.

After the conversion is performed and the initial reference information is added, the following fields of the flight information table are generally populated.

FLIGHT INFORMATION TABLE

CLIENT
ESTIMATE NUMBER
AGENCY
CALL LETTER
NETWORK
MARKET
PROGRAM NAME
TOTAL SPOTS PURCHASED
ITEM NUMBER
FROM TIME
TO TIME
FROM ALLOWANCE
TO ALLOWANCE
WEEK OF
MONDAY
TUESDAY
WEDNESDAY
THURSDAY
FRIDAY
SATURDAY
SUNDAY
ISCI GROUP
DURATION
FLIGHT ROW NBR
DETECTION ROW NBR (DETECTION I.D.)

As described below, each record of the flight information table includes other fields for associating flight information to detections of broadcast advertisements. For example, the records of the flight information table include a DETECTION I.D. field which is used to associate flight records to detection records, as described further below.

Step 5—Detections

As discussed above, the method and system of the present invention comprises a plurality of electronic detection devices located in various broadcast markets that are configured to receive and analyze broadcasts on a number of channels of a number of broadcast mediums. Two or more detection devices may receive signals from the same channel in the same market to provide redundancy and fault tolerance, in which case duplicative detection records from redundant detection devices are preferably identified and/or removed.

The detection devices detect actual market broadcast instances of encoded broadcast items, such as encoded advertisements, and record information regarding each detected actual market broadcast instance, including a unique code for the device, a unique code for the detection event, and the date, time, channel, duration, and detected code. The detection information is consolidated from the plurality of detection devices and processed, and, as described further below, compared to expected broadcast occurrences specified by the flight information.

Detection information from each detection device is initially enhanced with certain reference information which is placed in the associated records of the detection table. The sources of the reference information used to initially enhance the detection information may include the monitoring device information, the channel information and the local broadcaster information. After initial enhancement, the detection table includes the following fields:

INITIALLY ENHANCED DETECTION TABLE

DEVICE I.D.
DETECTION I.D.
DETECTED CODE

INITIALLY ENHANCED DETECTION TABLE

DURATION
LOCAL DATE
LOCAL TIME
CALL LETTER (may differ if split channel condition)
REPORTED CALL LETTER
DEVICE MARKET Then, the detection information is enhanced further with the program schedule information. In particular, PROGRAM NAME, NATIONAL CALL LETTER, DISTRIBUTOR and TIME ADJUSTMENT field information associated with the program scheduled to air during each detection is placed in the PROGRAM NAME, NATIONAL CALL LETTER, DISTRIBUTOR and TIME ADJUSTMENT fields in the detection records in the detection table. Specifically, a look-up is performed based on the LOCAL DATE+LOCAL TIME+BROADCAST MARKET+CALL LETTER+TYPE OF STATION combination of the detection record for a match in the respective fields of the program schedule table, and the information from the PROGRAM NAME, NATIONAL CALL LETTER, DISTRIBUTOR and TIME ADJUSTMENT fields of matching record in the program schedule table is placed in the respective fields of the matching record in the detection table.

Broadcast station schedules are more complex and stored individually. So for lookups on broadcast stations events, the specifics of the detection is used directly. Since national cable channels are not as complex, it is unnecessary to store each markets copy of that cable network. This is where the National cable adjustment table is used to compute the feed and any standard adjustment; The TV schedule look up is then performed and any schedule adjustment value for that program is applied to the adjustment from the national adjustment table The detection information is also enhanced with the encoded advertisements information and the agency commercial information. Specifically, the DETECTED CODE of each detection record is used to perform a look-up in the encoded advertisements table to obtain the associated ISCI CODE, which may be placed in an ISIC CODE field in the associated detection record. Alternatively, the ISCI CODE of the encoded advertisements table may simply overwrite the DETECTED CODE in the associated detection record. In addition, the AGENCY, CLIENT and MULTI-MARKET BROADCAST associated with the ISCI CODE is obtained from the encoded advertisement table with a look-up based on the ISCI CODE. Alternatively, AGENGY and CLIENT associated with the ISCI CODE may be obtained from the agency commercial table with a look-up based on the DETECTED CODE or ISCI CODE.

The detection information is also compared to the broadcast day information to determine if an actual detection date should be adjusted to correspond with the associated broadcast day. Specifically, the LOCAL TIME of each detection record is compared to the CUT-OFF TIME of the record broadcast day table having the same AGENCY+CLIENT combination as the detection record. If the LOCAL TIME of the detection record is less than the CUT-OFF TIME of the matching broadcast day record, then one day is subtracted from the LOCAL DATE field of the detection record.

The detection is further enriched with a day part label by looking up what daypart this detection corresponds to.

Preferably, the record is also enhanced with the corresponding date and time of the base time zone (e.g., ET) in BASE TIME-ZONE DATE and BASE TIME-ZONE TIME fields of the record, which may be calculated using the DEVICE MARKET, LOCAL DATE and LOCAL TIME, provided the time difference between each (device) market and the base market is known.

The detection information may then be placed in a processed detections table having the fields described above.

Step 5—Associate Related National Detection Records

Review of Base Market

A review of all new detections which have an iscicd which has been labeled Y in the NATIONAL MULTI-MARKET BROADCAST field is then conducted. Its purpose is to associate related market detection records to one another, records of the processed detections table are compared to one another to determine if they are related to the same broadcast. Related market detection records are associated with an anchor detection record in the processed detections table, which may be a discrete "synthetic" record or which may be a designated one of the actual detection records. Specifically, each detection record related to a multi-market advertisement, which detection is from a predefined base broadcast market (e.g., NY), is reviewed to see if a matching anchor detection record already exists for the compared detection record.

A multi-market detection record will match an anchor detection record if the two records have the same ISCI CODE, DISTRIBUTOR and adjusted detection date and time, where the adjusted detection date and time is determined using the LOCAL DATE and LOCAL TIME of the compared detection record as adjusted by its TIME ADJUSTMENT. For example, a detection record having an ISCI CODE of "AAA1234", a DISTRIBUTOR of "ABC", a LOCAL DATE of "Nov. 20, 2002", a LOCAL TIME of "10:00:00" and a TIME ADJUSTMENT OF "−60" will match an anchor detection record having the same ISCI CODE, DISTRIBUTOR and LOCAL DATE, and a LOCAL TIME of "09:00:00".

Additionally, a match between an actual detection record and an anchor detection record is preferably made if the adjusted date and time of the actual detection record is within a predetermined first association time window (e.g., X minutes) of the LOCAL DATE and LOCAL TIME of the anchor record. That is, a predetermined variance is allowed such that an exact date/time match is not required If a match with an anchor detection record is found, then all of the actual detection records associated with that anchor detection record, if any, are reviewed to see if another actual detection record having the same BROADCAST MARKET as the compared detection record has already been associated with the anchor detection record. If no such other detection record has been associated with the anchor detection record, then the compared detection record is associated with the anchor detection record. Such an association can be created by placing the table row number of the anchor detection record in an ANCHOR DETECTION ROW field in the compared record, or by any other suitable method of creating an association.

When a detection record is associated with an anchor detection record, a MARKET COUNT field of the anchor detection record is preferably incremented by 1. As can be appreciated, the MARKET COUNT field holds a value equal to the number of individual detection records associated with the anchor detection record.

If a matching anchor detection record is not found for the compared multi-market advertisement, then a new anchor detection record is created (with a MARKET COUNT of 1) and the compared detection record is associated with the new anchor record, as described above.

Preferably, the anchor detection record is a discrete, or "synthetic" record and is distinguished from actual detection records in-the processed detections table. For example, a distinguishing value is placed in a predetermined field in the record, such as the DEVICE MARKET field. The distinguishing value can be "Anchor", or "National", or some other predetermined distinguishing value. Further, several fields from the actual detection record are copied to the anchor detection record, including:

| ANCHOR DETECTION RECORD FIELDS FROM ACTUAL DETECTION RECORD |
| --- |
| DETECTION I.D. |
| LOCAL DATE |
| LOCAL TIME |
| PROGRAM NAME |
| NATIONAL CALL LETTER |
| DISTRIBUTOR |
| ISCI CODE |
| AGENCY |
| CLIENT |

All market records which make up the national Synthetic record have the Detection Id from the national synthetic record posted in their corresponding market common row field, i.e., ANCHOR DETECTION ROW.

Removal of Non-Qualified Anchor Records

Then, the MARKET COUNT value of each anchor detection record is compared to a predetermined minimum value. If the MARKET COUNT value of an anchor detection record is less than the predetermined minimum value and the anchor detection record is not associated with a record in the flight information table (as discussed below), the anchor detection record is considered to be non-qualified and the associations between the associated actual detection records and the anchor record are eliminated (e.g., by clearing the ANCHOR DETECTION ROW field of the actual detection records). Further, if the non-qualified anchor detection record is a discrete record, the anchor detection record is deleted from the processed detections table.

Review of All Markets

Next, the unassociated actual multi-market detection records from each market are compared to the existing anchor detection records to determine if the actual detection records are related to an existing anchor detection record. As above, a match is found when the actual detection record and the anchor market detection record share the same ISCI CODE, DISTRIBUTOR and adjusted date and time, as described above. However, preferably a secondary association time window greater than the initial association time window (i.e., a larger variance) is allowed. If a match is found, the ANCHOR DETECTION ROW and MARKET COUNT fields are updated accordingly.

Further, the remaining unassociated actual multi-market detection records from each market are compared to the existing anchor detection records. In this instance, a match is found if the NATIONAL CALL LETTER, BASE TIME-ZONE DATE and BASE TIME-ZONE TIME match the NATIONAL CALL LETTER, LOCAL TIME and LOCAL DATE of the anchor detection record, again with a time window greater than the initial associated time window. As above, if a match is found, the ANCHOR DETECTION ROW and MARKET COUNT fields are updated accordingly.

Finally, the remaining unassociated actual multi-market detection records from each market are compared to the existing anchor detection records, where, in this instance a match is found when the actual detection record and the anchor detection record share the same ISCI CODE, DISTRIBUTOR, and adjusted detection date and time with a time window greater than the secondary association time window. If no match is found for a remaining unassociated multi-market detection record in this instance, an anchor detection record is created for the record and the MARKET COUNT (value of 1) and ANCHOR DETECTION ROW fields are set accordingly.

The result of the process of associating related market detections is a processed detection table having four types of records: (1) qualified anchor detection records associated to at least the predetermined minimum number of actual detection records and market=NATL, (2) anchor detection records associated less then the Minimum number of markets=NATL but considered a Local anomalies of National detections, (3) actual detection records associated with anchor detection records, and (4) actual detection records not associated with anchor detection records (non national iscicd).

Step 6—Associating Detections to Flights

Associating Detections to Flights

As described above, the collective flight information may be either National in Nature or focused on specific markets. As a result the callletter and Market field have been set accordingly. For example a national flight could have as the callletter ABC and NATL as the market. If the flight was market focused on the New York market the callletter would be WABC and the Market NY.

On the detection side the Synthetic National detections with a market code of NATL (Types 1 & 2 from above) have been generated from the individual market detections for national isci's. These are either qualified or Local Anomalies (non-qualified). In either case the individual markets detections for the nationally labeled iscicd (type 3 from above) have been associated via a common value in the NationalCommonRow (or ANCHOR DETECTION ROW). The type 4 records are non national market records.

Direct Match

Previously Unmatched National qualified detections (type 1), and non national market detections (type 4), are compared with unmatched flight detail items. The system checks each unmatched flight records, looks to see if a correspond unmatched detection exists which completely satisfies the criteria of the flight detail. (Ie it has the same agency, client, market, callletter, duration, and the detected iscicd is contained with in the set of isci's in the flight iscigrp, and time of the detection completely occurs with in the start & end dates, and it matches an allowable day of the week rotation setting and it falls with in the start and end times. If the system is comparing National Syndicated flights with National Syndication detections the program name must also match). When a match occurs the flight and detections records are updated to associate each with the other. The flight record is given the This association also moves them out of the unmatched pool of both types of records. The flight record is updated to contain the detection Id of the corresponding detection. And the detection record is updated to contain the flight row of the corresponding flight record. Furthermore If the detection was a national detection all market detections which share the same nationalcommonrow value are also updated to contain the corresponding flight row. This mutual updating take all records corresponding to the match out of the pending pool.

In addition, a FLIGHT MATCHED field of the flight record may be set (e.g., to "1", "YES") to indicate that the flight is associated with a detection record.

Further, in the case of a direct match, a FLIGHT PURCHASED field of the flight record may be set (e.g., to 1) to indicate that the detected occurrence of the broadcast advertisement was one of the units indicated in the line item of the buy information.

Preferably, flight records are compared in a predetermined order to optimize matching accuracy. For example, prior to or during matching, the flight records may be sorted. Primarily, the flight records may be sorted by a time window specified in the fight record, which may be held in a TIME WINDOW field in the flight record. The time window is the difference between the FROM TIME and the TO TIME of the flight record. Secondarily, the flight records may be sorted by the size of the ISCI GROUP, which may be ascertained by determining the length of the field (i.e., the number of characters), or by any other suitable manner. A tertiary sort of the flight records may be made based on the ITEM NUMBER field, where 1 of N would precede N of N.

Secondary Comparisons

Once the dead on matching step has been performed a series of secondary comparisons are made for imprecise matches with various parameters. These secondary comparisons are set forth in a preferred order, however it can be appreciated that other orders may be suitable.

Match with a Primary Time Allowance

In one secondary comparison, qualified unassociated anchor detection records are compared to unassociated multi-market flight records in a manner similar to the manner described above with respect to direct matches. However, in this instance, a predetermined primary time allowance is provided, which has the effect of decreasing the FROM TIME and increasing the TO TIME of the flight record by the primary time allowance. If a match is found in this comparison, the anchor detection record and flight record are associated to one another as described above. Also as above, the FLIGHT MATCHED field of the flight record may be set (e.g., to "1", "YES") to indicate that the flight is associated with a detection record, and a FLIGHT PURCHASED field of the flight record may be set (e.g., to 1) to indicate that the detected occurrence of the broadcast advertisement was one of the units indicated in the line item of the buy information.

Match with Wrong ISCI Same duration

Another secondary comparison can be made in the same manner as described above with respect to a direct match, however, in this instance, a match is made even if the ISCI CODE of the detection record is not within the ISCI GROUP of the flight record, but is of the same agency, client and duration.

Match with Wrong ISCI of Wrong Duration

Another secondary comparison can be made in the same manner as described above with respect to a match with a wrong ISCI code, however, in this instance, a match is made if the ISCI CODE of the detection record is not within the ISCI GROUP of the flight record and the DURATION of the detection record is not the same as the DURATION of the flight record.

Match with an Extra Spot

In another secondary comparison, qualified unassociated anchor detection records are compared to multi-market flight records to determine whether the anchor detection record matches a flight record wherein the ITEM NUMBER field of the flight record has the form N of N (e.g., 3 of 3) and the flight record has already been associated with an anchor record, which indicates that all the units of the line item of the buy information related to the flight record have already been satisfied. Specifically, qualified unassociated anchor detection records are compared to multi-market flight records in a manner similar to the direct comparison described above; however, the comparison is made to multi-market flight records that have already been associated with an anchor detection record. Further, a match is made if all of the comparisons made with respect to a direct match are true and ITEM NUMBER field of the flight record has the form N of N. In this instance, a match is made with an extra spot.

If an extra spot match is made, then a new flight record is created with the same information as the matched flight record, however a value of "N+1 of N" (e.g., 4 of 3) is placed in the ITEM NUMBER field of the new flight record, to indicate that this is an extra spot. The matching anchor detection record and new flight record are associated to one another, as described above.

In addition, a FLIGHT MATCHED field of the flight record may be set (e.g., to "1", "YES") to indicate that the flight is associated with a detection record. Further the FLIGHT PURCHASED field of the flight record may be set (e.g., to 0) to indicate that the detected occurrence of the broadcast advertisement was not one of the units indicated in the related line item of the buy information.

Match with an Extra Spot Using the Primary Time Allowance

A combination of the match with extra spot and allowing for the primary time allowance.

Match with a Secondary Time Allowance

Another secondary comparison can be made in the same manner as describe with respect to the primary time allowance, with a secondary time allowance greater than the first.

Match with Wrong ISCI in an Extra Spot

Another secondary comparison can be made in the same manner as described above with respect to a match with an extra spot, however, in this instance a match is made even if the ISCI CODE of the detection record is not within the ISCI GROUP of the flight record.

Match with Wrong ISCI of Wrong Duration in an Extra Spot

Another secondary comparison can be made in the same manner as described above with respect to a match with an extra spot, however, in this instance a match is made even if the ISCI CODE of the detection record is not within the ISCI GROUP of the flight record and the DURATION of the detection record is not the same as the DURATION of the flight record.

Discrepancies

A match made during one of the secondary comparisons may be considered a match with a discrepancy. A discrepancy name and code may be placed in the flight record to indicate the type of discrepancy. In particular, DISCREPANCY NAME and DISCREPANCY CODE fields of the flight record may be set as follows:

| Secondary Comparison | DISCREPANCY CODE |
| --- | --- |
| Match with primary time Allow | WITHIN ALLOW |
| Wrong ISCI | WC |
| Wrong ISCI, wrong duration | WC DiffLen |
| Extra Spot | EXTRA SPOT |
| Extra Spot primary allowance | EXTRA SPOT |

-continued

| Secondary Comparison | DISCREPANCY CODE |
| --- | --- |
| Secondary time allowance | OUTSIDE ALLOW |
| Wrong ISCI, extra spot | WC EXTRA |
| Wrong ISCI, wrong duration, | WC DiffLenExtra |

Step 7—Custom Viewing and Reporting

The result of the detection and matching process is a series of tables which may be queried to produce reports as to fulfilled, unfulfilled and partially fulfilled (erroneous) broadcast orders.

Referring to FIGS. 2-5, the system provides summary reports on fulfilled and unfulfilled orders, as well as certain types of erroneously fulfilled orders, such as extra spots and wrong advertisements (i.e., wrong creative).

Figure 4:
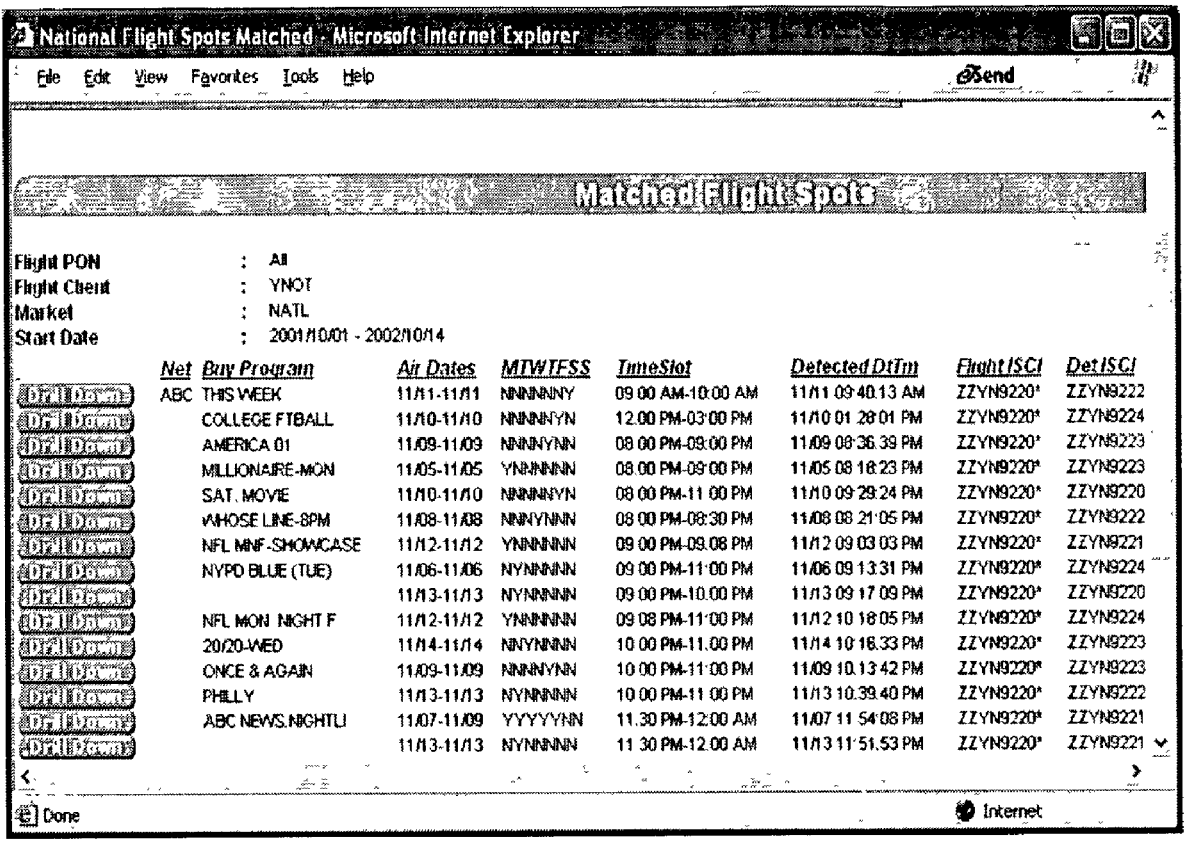

Preferably, the reports include links, such as "View Details" and "Drill Down" that display underlying information in increasing detail. For example, FIG. 3 is a screen shot of a report generated from selecting the "View Details" button, under the "Purchased" column of the National Flight Summary (FIG. 1). This report provides details regarding the spots purchased with the flights display in FIG. 1. FIG. 4 is an example of a report generated by selecting the "View Details" button under the "Matched" column of FIG. 1. This report provides details on the anchor detections associated with the flights displayed in FIG. 1. Further details regarding the actual market detections that are associated with such anchor market detections is available by selecting the associated "Drill Down" button in the report of FIG. 4, which action produces the report of FIG. 5. The report of FIG. 5 provides detailed information regarding individual actual market detections that comprise the associated anchor market detection.

Therefore, as can be appreciated the present invention provides a method and system for tracking, managing multi-market broadcast advertising that provide accurate, independent confirmations of the fulfillment of broadcast advertising orders, that provide significant advantages in matching multi-market broadcasts of advertisements to multi-market advertising orders, that provide significant advantages in reporting of fulfilled and unfulfilled orders and that provide such matching, confirmation and reporting for a large number of broadcasts over a large number of broadcast markets.

It should be understood, of course, that the specific form of the invention herein illustrated and described is intended to be representative only, as certain changes may be made therein without departing from the clear teachings of the disclosure. Accordingly, reference should be made to the following appended claims in determining the full scope of the invention.

What is claimed:

1. A method of analyzing multi-market broadcasts of commercial advertisements, comprising:

assigning unique identifiers to a plurality of commercial advertisements;

recording information regarding said plurality of commercial advertisements and said respective unique identifiers in a computer database;

receiving electronic detections of a plurality of actual market-broadcast instances of at least one of the plurality of commercial advertisements, said plurality of actual market-broadcast instances comprising a plurality of broadcast markets, and each of said actual market-broadcast instances associated with an actual broadcast time;

recording information regarding said detections in the computer database;

associating related ones of said plurality of actual market-broadcast instances of said at least one commercial advertisement in the computer database, said related ones of said actual market-broadcast instances comprising a plurality of broadcast markets;

recording information regarding a plurality of multi-market broadcast orders of commercial advertisements in the computer database; and associating said associated related actual market-broadcast instances of said at least one commercial advertisement with a related one of the plurality of multi-market broadcast orders for said at least one commercial advertisement in the computer database having a direct match of the assigned unique identifiers, and generating a subset of said associated related actual market-broadcast instances of said at least one commercial advertisement having an imprecise match of the assigned unique identifiers.

2. A method as defined in claim 1, wherein said related ones of said actual market-broadcast instances are related to a common featured program broadcast in said plurality of broadcast markets.

3. A computer-implemented method of analyzing advertisements broadcast in multiple markets comprising:

receiving a broadcast market order comprising a set of flight information parameters to verify order fulfillment with at least one detection device;

monitoring a plurality of broadcast markets to detect a plurality of advertisements with the at least one detection device, each of the plurality of advertisements comprising at least one unique identifier and an actual broadcast time; and generating a first set of the detected plurality of advertisements with the broadcast market order in accordance with a direct match of the set of flight information parameters and the at least one unique identifier, and generating a second set of the detected plurality of advertisements having a partial match between the set of flight information parameters and the at least one unique identifier, the first and second sets stored in a computer database.

4. A method as defined in claim 3, wherein the broadcast market order comprises a first set of advertisements from the plurality of advertisements, the first set comprising advertisements having identical unique identifiers.

5. A method as defined in claim 4, further comprising associating the first set of advertisements with a first anchor detection record.

6. A method as defined in claim 5, wherein the broadcast count is incremented upon detection of an advertisement associated with the first anchor detection record.

7. A method as defined in claim 5, further comprising creating a second anchor detection record when one of the plurality of advertisements detected is associated with a second set of advertisements.

8. A method as defined in claim 7, wherein the second set of advertisements are associated with a second broadcast market order.

9. A method as defined in claim 3, further comprising generating a plurality of subsets of the set of flight information parameters, each of the plurality of subsets of flight information parameters associated with a secondary parameter that, when detected, confirms a match between at least one of the detected advertisements having the partial match with the set of flight information parameters and the broadcast market order.

10. A method as defined in claim 9, wherein the set of flight information comprises a first industry standard commercial identifier (ISCI) code, and the secondary parameters comprises a second ISCI code.

11. A method as defined in claim 10, wherein the second ISCI code is within an ISCI group of the first ISCI code.

12. A method as defined in claim 9, wherein the set of flight information comprises a first advertisement duration, and the secondary parameter comprises a second advertisement duration that is at least one of greater-than or less-than the first advertisement duration.

13. A method as defined in claim 9, wherein the set of flight information comprises a first from-time, and the secondary parameter comprises a second from-time that is at least one of greater than or less than the first from-time.

14. A method as defined in claim 3, wherein the set of flight information parameters comprises at least one of a client name, an agency name, a call letter code, an industry standard commercial identifier (ISCI) code, an ISCI group, a from-time, a to-time, a from-allowance, or a to-allowance.

15. A method as defined in claim 3, wherein the partial match with the set of flight information parameters comprises detecting at least one of a dissimilar client name, a dissimilar agency name, a dissimilar call letter code, a dissimilar industry standard commercial identifier code, a dissimilar from-time, a dissimilar to-time, a dissimilar from-allowance, or a dissimilar to-allowance.

16. A computer-implemented method to qualify anchor detection records comprising:

receiving a plurality of advertisements associated with an actual broadcast time and storing the plurality of advertisements in a computer database, at least some of the plurality of advertisements comprising embedded flight information parameters;

associating related ones of the received plurality of advertisements in the computer database with an anchor detection record, each related one of the received plurality of advertisements to increment a broadcast count to verify order fulfillment with a detection device when a set of flight information parameters associated with a market order directly matches the embedded flight information parameters;

generating a subset of the received plurality of advertisements to be stored in the computer database, wherein the embedded flight information parameters imprecisely match the set of flight information parameters associated with the market order; and qualifying the anchor detection record based on the broadcast count.

17. A method as defined in claim 16, wherein the anchor detection record is qualified when the broadcast count exceeds a minimum value.

18. A method as defined in claim 17, wherein the qualified anchor detection record is associated with at least one of a geographic market, a distributor code, a national call letter code, a local time, or a date.

19. A method as defined in claim 16, wherein qualifying the anchor detection record further comprises removing the anchor detection record when the broadcast count is below a minimum value.

20. A method as defined in claim 16, further comprising generating a plurality of subsets of the set of flight information parameters associated with the market order, each of the plurality of subsets associated with a secondary parameter that, when detected, confirms a match between at least one of the plurality of advertisements having the imprecise match with the set of flight information parameters and the market order.

21. A method to verify advertisement fulfillment in multiple markets comprising:

receiving an advertisement broadcast order comprising a set of flight information parameters;

monitoring a plurality of broadcast markets with at least one detection device to detect a plurality of advertisements, each of the plurality of advertisements comprising encoded parameters to identify the advertisement;

generating a detection table comprising the detected encoded parameters and local market parameters indicative of each one of the plurality of broadcast markets in which the advertisement is detected;

comparing the set of flight information parameters with the detection table to identify a first set of advertisements from the plurality of detected advertisements having a direct match between the set of flight information parameters and the detection table; and identifying a second set of advertisements from the plurality of detected advertisements having a partial match between the set of flight information parameters and the detection table.

22. A method as defined in claim 21, further comprising generating a subset of the flight information parameters associated with at least one secondary parameter that, when detected, confirms a match between at least one of the second set of advertisements associated with the partial match.

* * * * *

UNITED STATES PATENT AND TRADEMARK OFFICE
CERTIFICATE OF CORRECTION

PATENT NO. : 7,624,409 B2 Page 1 of 1
APPLICATION NO. : 10/274018
DATED : November 24, 2009
INVENTOR(S) : Thomas J. Whymark It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1281 days.

Signed and Sealed this

Twenty-sixth Day of October, 2010

David J. Kappos
*Director of the United States Patent and Trademark Office*